Jan. 15, 1935.    F. R. WEYMOUTH    1,988,148
AILERON AND FLAP COMBINATION
Filed Feb. 18, 1933
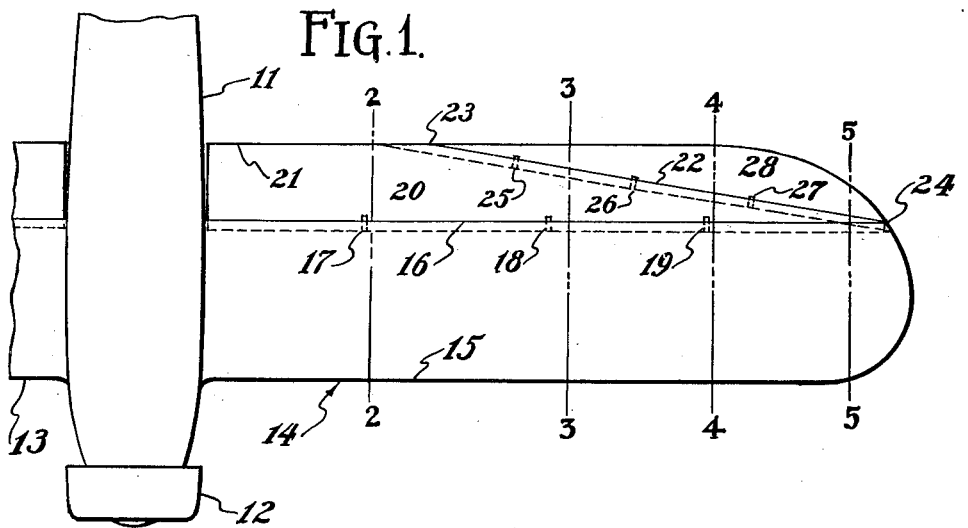
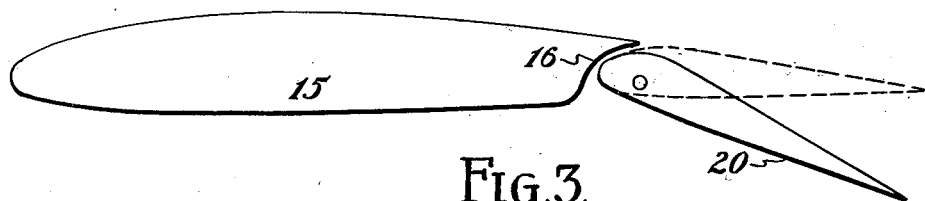
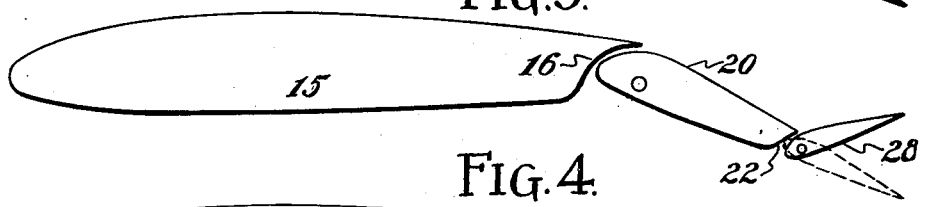
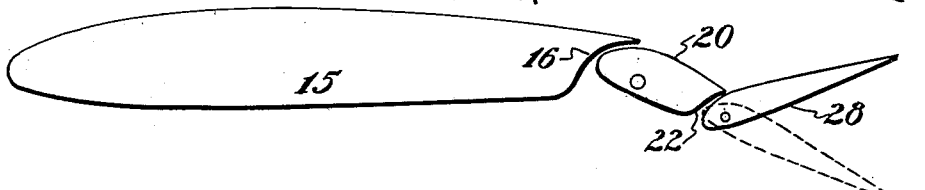
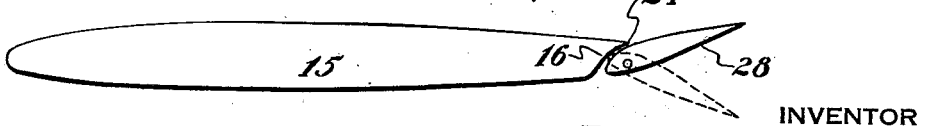
INVENTOR
FREDERICK R. WEYMOUTH
BY HIS ATTORNEY Patented Jan. 15, 1935

1,988,148

UNITED STATES PATENT OFFICE 1,988,148

AILERON AND FLAP COMBINATION

Frederick R. Weymouth, Buffalo, N. Y., assignor to Curtiss Aeroplane & Motor Company, a corporation of New York Application February 18, 1933, Serial No. 657,321

2 Claims. (Cl. 244—29)

This invention relates to aircraft, and particularly, to improvements in the arrangement of ailerons and trailing edge flaps for the wings thereof.

It is well known in the art that trailing edge flaps on the wings of aircraft allow for improvements in performance of the aircraft, particularly in reducing landing speed when the flaps are adjusted to a position in which the wing camber is increased. To obtain the highest utility from flaps, they should preferably be coextensive with the wing span. But to provide ailerons for lateral control of the aircraft, then, it is usually necessary to shorten the flap so that the ailerons may lie in an effective position at the trailing edge of the outer portions of the wings. Combinations have been devised wherein substantially rectilinear ailerons have been hinged to the flaps, in cutouts in the flaps, but this expedient is not wholly satisfactory, since the aileron ends, moving with respect to the flaps, allow end losses which detract considerably from the effectiveness of the flap.

It is an object of this invention to provide a biased, or skew, aileron, hinged to the trailing edge flap of a wing, in such a manner that efficiency losses due to eddying air currents around the ends of the ailerons are avoided.

A further object is to provide an efficient aileron for a wing having a trailing edge flap substantially coextensive with the wing span.

A further object is to provide a wing equipped with a trailing edge flap and aileron, the latter two elements cooperating so that maximum flap effectiveness may be obtained along with adequate aileron effectiveness for lateral control of the aircraft.

A further object is to provide a biased or skew aileron, swingable independently about a slanting axis, mounted on a swingable trailing edge flap adjustable about an axis substantially normal to the line of flight.

A still further object is to provide a combined flap and aileron, the trailing edges of which are always in continuity with each other.

Additional objects will be apparent from a reading of the annexed description and claims and from a consideration of the drawing, in which:

Fig. 1 is a plan of a forward portion of an aircraft embodying the invention; and Figs. 2, 3, 4 and 5 are, respectively, sections on the lines 2—2, 3—3, 4—4, and 5—5 of Fig. 1.

In the drawing, similar numerals indicate similar parts. An airplane, shown in part in Fig. 1, comprises a fuselage 11, having an engine enclosed in well-known manner within a cowl ring 12, and having wings 13 and 14 extending outward therefrom. These wings 13 and 14 are similar, the wing 13 carrying similar elements to those carried by the wing 14, now to be described.

An airfoil 15, along its rearward or trailing edge 16, is provided with a plurality of alined hinges 17, 18 and 19, about which is adapted to swing a flap 20. Suitable controls, not shown, but well-known to those skilled in the art, are provided for turning the flap in different angular attitudes with respect to the airfoil 15. An alternative flap position is illustrated in dotted lines in Fig. 2.

It will be seen that the flap 20 and its hinge line are coextensive with the wing span, and that said hinge line is substantially parallel to the inner trailing edge 21 of the flap.

The outer trailing edge 22 of the flap 20 is tapered from a point such as 23 intermediate the wing span, to a point such as 24 along the outer edge of the wing 14. In the embodiment shown, the tapered trailing edge 22 intersects the trailing edge 16 of the airfoil 15 at the outer end thereof.

Along the tapered edge 22 of the flap 20, are spaced a plurality of alined hinges 25, 26 and 27, which are arranged to carry an aileron 28 for independent adjustment with respect to the flap 20. Alternate positions for the aileron 28 are shown in Figs. 3, 4 and 5. Control means, not shown, but well-known in the art, may be provided for the aileron 28. The trailing edge of the aileron, in conjunction with the flap 22 and the airfoil 15, together form the wing 14, the outer dimensions of the whole assembly being arranged to give proper aerodynamic characteristics.

Functionally, the aileron hinge axis moves with the flap as the latter is adjusted, but the aileron may at all times be moved with respect to the flap. The constant continuity of the trailing edge of the aileron 22 with the edge portion 21 of the flap 20, prevents the breaking up of air flow over the wing surface, combining to allow full efficiency of flap operation throughout the span with the known efficient characteristics of the skew aileron, regardless of flap position: End losses from non-continuous trailing edges are eliminated, and simplicity in construction results.

A further advantage accruing from the construction disclosed is the balancing effect which the aileron lends to the flap. For instance, the aileron positions of Figs. 3 and 4 (full lines) or an intermediate or neutral position between the positions shown by the full and the dotted lines would tend to lower the flap 20—if the flap is to be lowered, the effort for effecting the movement is reduced.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. In combination, an airfoil, an adjustable trailing edge flap hinged to and substantially coextensive with the rearward edge thereof, the outer portion of the trailing edge of said flap tapering in a substantially straight line from a point intermediate its span to intersect the outer airfoil end at the flap hinge axis, pivots spaced along said tapered edge, and an aileron carried along its leading edge by said pivots.

2. In combination, in an airfoil, a hinged trailing edge flap substantially coextensive therewith, the hinge axis of said flap extending on a line substantially parallel to the trailing edge of said flap, and a biased aileron hinged to and toward the outer end of said flap on a hinge axis intersecting the trailing edge of said flap at a point intermediate its span and intersecting the outer end of said wing at a point substantially coincidental with the intersection of said flap hinge axis with said outer wing end.

FREDERICK R. WEYMOUTH.